(12) United States Patent
Mize

(10) Patent No.: US 8,590,525 B2
(45) Date of Patent: Nov. 26, 2013

(54) CHARCOAL IGNITER WITH DUAL-ACTION LOCKING GRATE

(75) Inventor: Charlie Mize, Ropesville, TX (US)

(73) Assignee: Charlie Mize, Ropesville, TX (US)

( * ) Notice: Subject to any disclaimer, the term of this patent is extended or adjusted under 35 U.S.C. 154(b) by 458 days.

(21) Appl. No.: 12/893,568

(22) Filed: Sep. 29, 2010

(65) Prior Publication Data

US 2012/0073559 A1 Mar. 29, 2012

(51) Int. Cl.
*A47J 37/07* (2006.01)
*F24B 15/00* (2006.01)

(52) U.S. Cl.
USPC ...................................... 126/25 B; 126/25 R

(58) Field of Classification Search
USPC .................. 126/25 B; 173/19; 16/110.1, 422, 16/425–427, 429; 251/305
See application file for complete search history.

(56) References Cited

U.S. PATENT DOCUMENTS 6,913,013 B1 * 7/2005 Mize ........................... 126/25 B

* cited by examiner

*Primary Examiner* — Kenneth Rinehart
*Assistant Examiner* — Tiffany Johnson
(74) *Attorney, Agent, or Firm* — Streets & Steele; Patrick K. Steele; Jeffrey L. Streets

(57) ABSTRACT

One embodiment of the invention provides a charcoal igniter with a dual-action actuator assembly for pivoting a pair of grate members back and forth between a charcoal-supporting position and a charcoal-releasing position. Moving an actuator arm inwardly to a first position secures the grate members in the charcoal-supporting position. Moving the actuator arm outwardly to a second position allows the grate members to move downward to the charcoal-releasing position. A handle secured to the igniter housing includes an integrated track for guiding movement of the actuator arm between the first and second positions. The actuator assembly has a locking feature for securing the handle in the first position for supporting charcoal while it is being ignited.

12 Claims, 6 Drawing Sheets

CHARCOAL IGNITER WITH DUAL-ACTION LOCKING GRATE

This application claims priority to U.S. provisional patent application Ser. No. 61/309,848 filed on Mar. 2, 2010.

BACKGROUND

1. Field of the Invention

The present invention relates to outdoor cooking apparatuses, and more particularly, to charcoal igniters used to preheat charcoal for use in a charcoal-burning grill.

2. Background of the Related Art

A barbecue grill is an apparatus for cooking food by applying heat directly from below the food. A cooking grid supports the food over a fuel source used to generate heat for grilling. The cooking grid has openings to pass hot air and smoke upwardly through the cooking grid to the food being grilled, and to allow fat, oil, and other materials generated while grilling to fall below the cooking grid. Two prevalent categories of grills are gas-fueled and charcoal-burning grills. Charcoal is often preferred as the fuel source, primarily because charcoal provides uniform, high cooking temperatures and the smoke from burning charcoals can impart a desirable flavoring to the food being grilled.

One of the challenges associated with charcoal grilling is safely and effectively igniting the charcoal. Charcoal is often ignited directly within the grill. However, a separate device referred to as a charcoal igniter may be used to ignite the charcoal before delivering the ignited charcoal to the grill. A quantity of charcoal to be ignited, typically in a briquette or natural-lump form, is placed in the igniter. Kindling, such as newspaper, may be used in lieu of lighter fluid as a fuel source for igniting the charcoal. The ignited charcoal may then be delivered from the charcoal igniter to the grill. An example of an existing charcoal igniter is provided in U.S. Pat. No. 6,913,013 to Mize.

DETAILED DESCRIPTION

Figure 1:
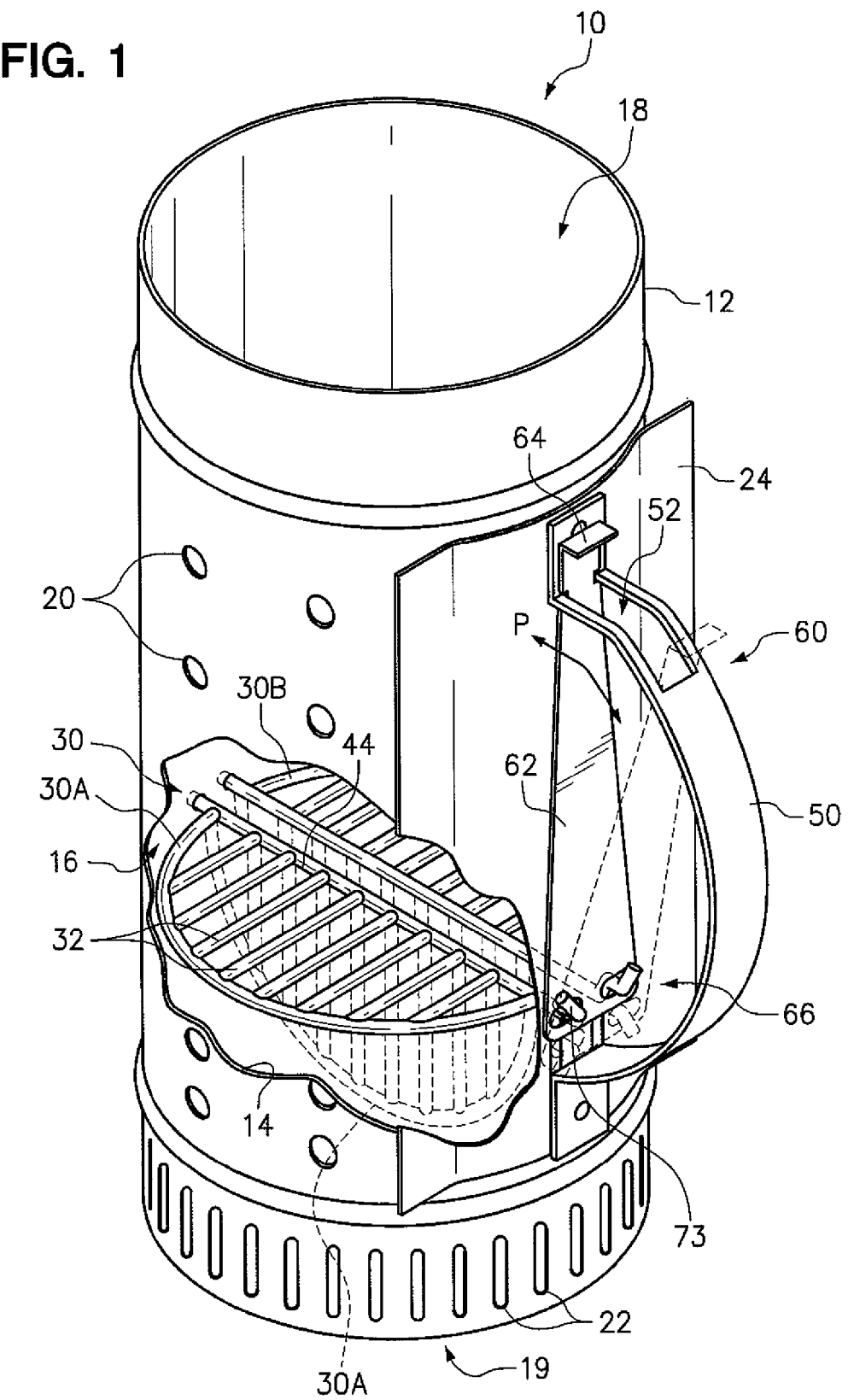
FIG. 1 is a perspective view of a charcoal igniter according to one embodiment of the invention.

FIG. 1 is a perspective view of a charcoal igniter 10 according to one embodiment of the invention. The igniter 10 includes a cylindrical housing 12 having a housing wall 14. The housing wall 14 defines an interior charcoal space 16 for receiving charcoal (not shown) to be ignited. The charcoal may be supported on a moveable grate 30. The grate 30 in this embodiment includes a pair of grate members 30A, 30B pivotally supported within the housing 12. The grate members 30A, 30B are similarly structured (for example, shown here as minor images of each other), with like features being accorded the same reference numerals. The grate members 30A, 30B are synchronously movable between a charcoal-supporting position (shown as a horizontal position in solid line type in FIG. 1) and a downwardly-angled, charcoal-releasing position (shown in dashed line type in FIG. 1). A handle 50 is secured to the housing 12 for lifting the igniter 10 by hand without directly touching the housing 12, since the housing 12 may be hot when burning coals. A heat shield 24 is secured to the housing 12, between the housing wall 14 and the handle 50, to provide a barrier to heat emanating from the housing 12 to a user's hand. Each grate member 30A, 30B is pivotally supported from the housing 12 by a support rod 44 that passes through the housing 12 at opposite corners of the grate members 30A, 30B, as further described below with reference to FIG. 4.

An actuator assembly generally indicated at 60 includes an actuator arm 62 movably coupled to the handle 50. A rectangular opening 52 on the handle 50 receives the actuator arm 62 near an upper end 64 of the actuator arm 62. A lower end 66 of the actuator arm is coupled to the support rod 44 near rod segment 73 and is used to apply a torque about a pivot axis of the grate member 30A, as discussed below. The actuator assembly 60 is slidably moveable along a track pathway "P" defined by the shape of the handle 50, for alternately moving the grate members 30A, 30B between the charcoal-supporting position (shown in solid line type) to the downwardly-angled, charcoal-releasing position (shown in dashed line type), to release charcoals from the grate 30. Moving the actuator arm 62 in a first direction away from the housing 12 allows the grate members 30A, 30B to move lower from the charcoal-supporting position to the charcoal-releasing position. Moving the actuator arm 62 back toward the housing 12 raises the grate members 30A, 30B back to the charcoal-supporting position. Desirably, a "dual-action" of the actuator assembly 60 allows the grate members 30A, 30B to be moved between the charcoal-support and charcoal-releasing positions entirely by moving the upper end 64 of the actuator arm 62 back and forth in alternate directions along the pathway P without having to manually position the grate members 30A, 30B by hand.

In one example method of use, the actuator arm 62 may be moved fully inward toward the housing 12 to position the grate members 30A, 30B in a horizontal, charcoal-supporting position. Charcoal to be ignited may be deposited onto the grate 30 through an opening 18 at the top of the igniter 10 while the grate 30 is in the horizontal, charcoal-supporting position. The weight of the charcoal and the grate 30 will try to pull downwardly on the actuator arm 62, but the actuator arm 62 rests on a generally horizontal portion of the handle 50 and remains in the upright position. A combustible material (not shown), such as paper or wood, may be positioned below the grate 30 as a fuel source for igniting the charcoal. The combustible material may be used in lieu of lighter fluid. However, lighter fluid may still be used to accelerate the ignition of the charcoal, if desired. The combustible material may then be ignited, which in turn causes the charcoal supported on the grate 30 to ignite.

The grate members 30A, 30B include spaced apart grill bars 32. Openings between the spaced-apart grill bars 32 allow flames and heat from the combustible material to reach the charcoal, and allow ash and other debris from the burning charcoals to escape by falling between the grill bars 32. A plurality of vents 22 below the grate 30 are provided to allow oxygen-containing air to enter the housing 12 to supply oxygen to the interior charcoal space 16 during combustion. A chimney effect may occur, drawing fresh air into the housing through vents near the base and releasing hot air and smoke from the combustible material (e.g. paper or wood) through the top. A plurality of additional air holes 20 may be provided at different circumferential and vertical positions along the housing 12.

The ignited charcoal may be supported on the grate 30 as long as necessary before transferring the charcoal to the grill. The igniter 10 may be safely carried to the grill by the handle 50. While holding the igniter 10 upright (e.g. the orientation of FIG. 1) over the grill with one hand, the actuator arm 62 may be moved outwardly by the other hand to lower the grate members 30A, 30B to the downwardly-angled, charcoal-releasing position, thereby releasing the charcoal into the grill. The hot charcoal falls between the downwardly-angled grate members 30A, 30B and the housing wall 14 of the housing 12, and through the open lower end 19 of the housing 12 to the grill.

Figure 2:
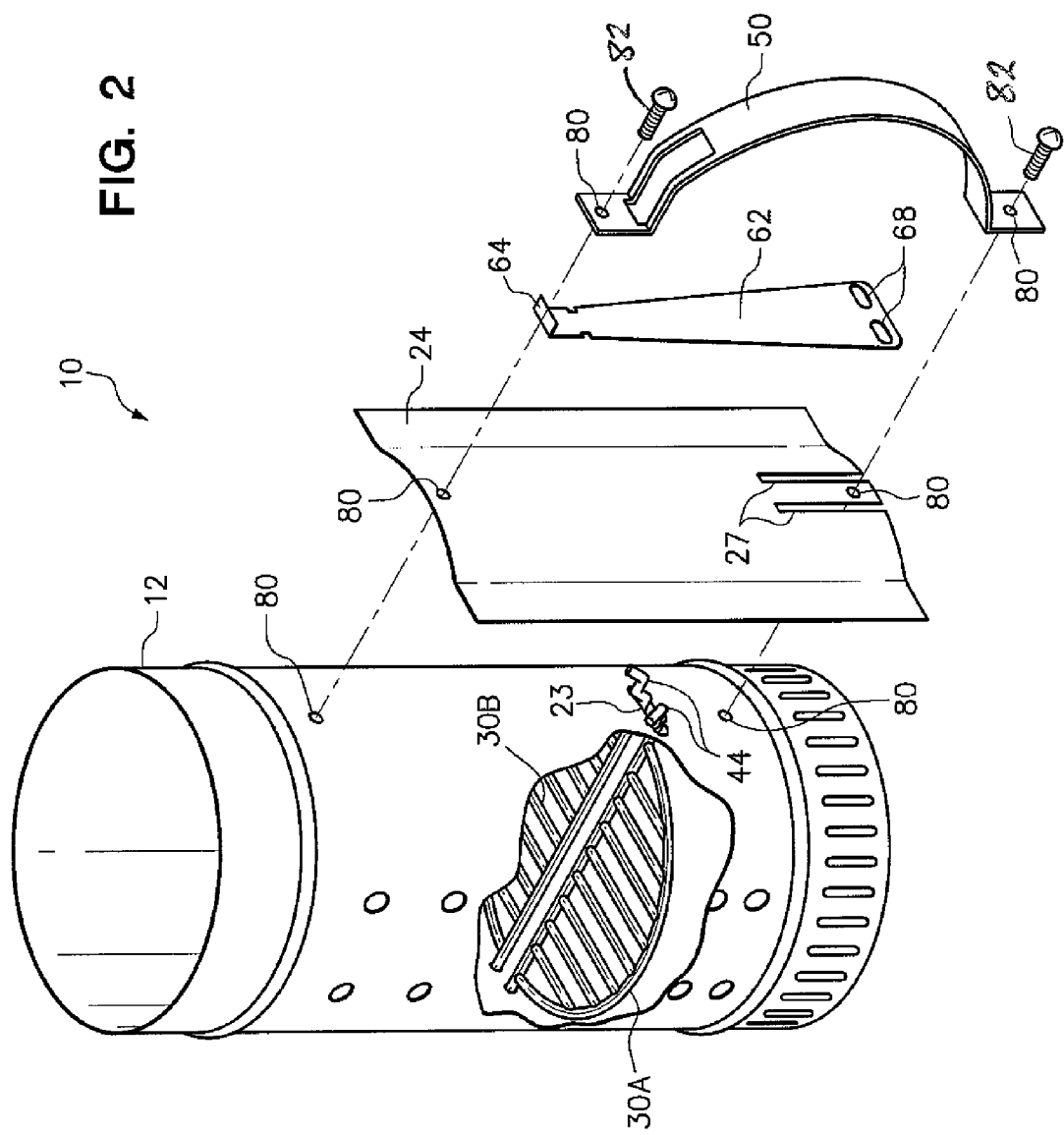
FIG. 2 is an exploded view of the charcoal igniter in the perspective of FIG. 1

FIG. 2 is an exploded view of the charcoal igniter 10 in the perspective of FIG. 1. The housing 12 includes a horizontally-oriented slot 23 that receives the end of each rod 44. The continuous slot 23 positions each rod 44 vertically with respect to the housing 12, and allows each grate member 30A, 30B to pivot about a shaft portion of the rod 44 as further discussed below. The continuous slot 23 is provided for accommodating the rod 44 on both grate members 30A, 30B (rather than a separate hole for each rod 44) to facilitate positioning the rod 44 through the slot 23 during assembly of the igniter 10. The heat shield 24 includes a pair of horizontally-spaced, vertically-oriented slots 27 that, when the shield is secured to the housing, horizontally space the rods 44 at a particular spacing within the elongate slot 23 of the housing 12, and laterally constrain the rods 44 while allowing the grate members 30A, 30B to pivot about the rods 44. The actuator arm 62 includes a pair of holes 68, with one hole 68 receiving the rod 44 of the first grate member 30A and the other hole 68 receiving the rod 44 of the second grate member 30B. The positioning of the rod 44 within the holes 68 allows the actuator arm 62 to move the grates 30A, 30B in response to vertical movement of the actuator arm 62, as further described below.

In one example method of assembly, the igniter 10 may be assembled by first positioning the grate members 30A, 30B inside the housing 12, with the rod 44 protruding through the horizontal slot 23. Next, the heat shield 24 is positioned against the housing 12, with the rods 44 protruding through the vertical slots 27. The actuator arm 62 is next positioned against the heat shield 24 with the rods 44 protruding through the holes 68 in the actuator arm 62. The handle 50 is then positioned against the heat shield 24, with the upper end 64 of the actuator arm 62 passing through the rectangular opening 52 on the handle 50. The handle 50 and heat shield 24 are secured to the housing 12 with threaded hardware 82, such as screws or bolts, passing through holes 80 on the handle, the heat shield 24, and the housing 12. Alternative fasteners, such as rivets, or alternative fastening techniques, such as welding, could be used to secure the components together.

Figure 3:
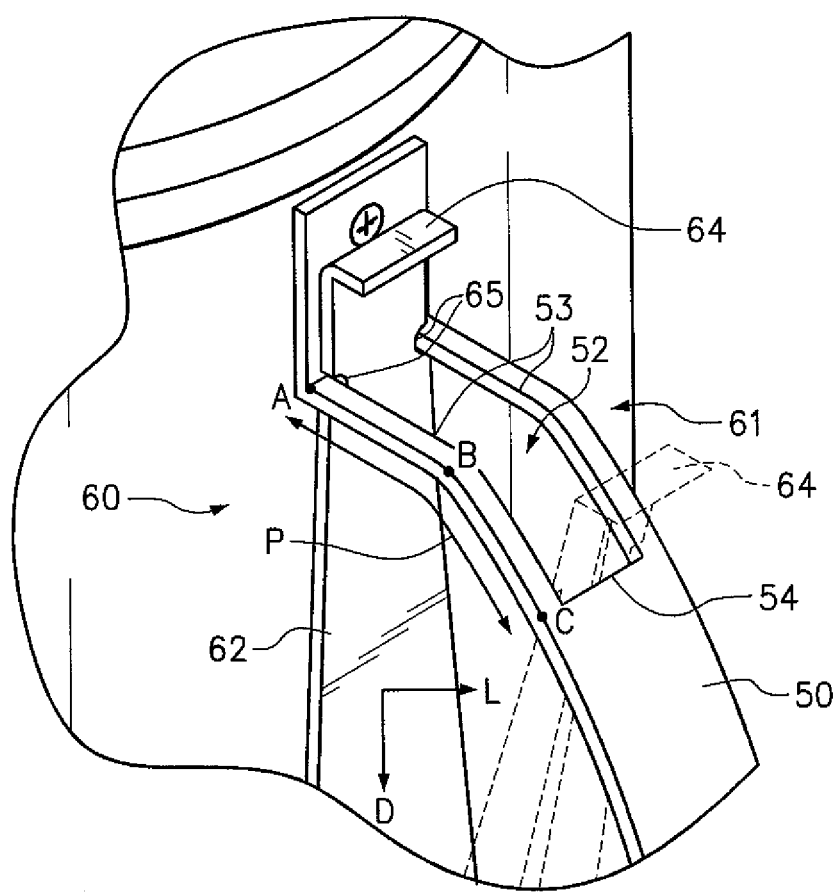
FIG. 3 is an enlarged detail view of a portion of the actuator.

FIG. 3 is an enlarged detail view of a portion of the actuator assembly 60 in the perspective of FIG. 1. A track 61 defined by the handle 50 guides movement of the actuator arm 62 along the pathway P. Specifically, the track includes opposing inner edges 53 of the rectangular handle opening 52. A groove 65 on each side of the actuator arm 62 receives the inner edges 53, such that the actuator arm 62 rides along the inner edges 53, following the contour of the handle 50 over the defined range of movement provided by the rectangular opening 52. The pathway P includes end points A and C and intermediate point B. End point A corresponds to positioning the actuator arm 62 inwardly against the housing 12. The opposite end point C corresponds to positioning the actuator arm 62 outwardly against an end stop 54 of the rectangular opening 52. Movement of the actuator arm 62 from end point A to the opposite end point C lowers the actuator arm 62 (including the holes 68), which allows the grate members 30A, 30B (see FIG. 1) to be lowered from the charcoal-supporting position to the downwardly-angled, charcoal-releasing position. Movement of the actuator arm 62 back from point C to point A raises the actuator arm 62 (including the holes 68), which raises the grate members 30A, 30B from the downwardly-angled, charcoal-releasing position to the charcoal-supporting position.

A first portion of pathway P between points A and B is mostly horizontal, and includes a horizontal or lateral component of movement "L." A second portion of pathway P between points B and C is angled downward, and includes a downward component of movement "D." Moving the end 64 of the actuator arm 62 from point A to point B provides mostly horizontal, lateral movement of the handle, which primarily "unlocks" the actuator arm 62 and the grates 30A, 30B to which the actuator arm 62 is coupled. Little or no downward movement of the actuator arm 62 occurs between point A and point B. However, moving the end 64 of the handle 62 further from point B to point C moves the actuator arm 62 more downwardly in the direction of component D. The downward movement of the actuator arm 62 releases support for grate members (discussed further with reference to FIGS. 3 and 4), which allows the grate members 30A, 30B to pivot about a fulcrum defined by the support rod 44 from the horizontal position to the downwardly-angled position. Moving the actuator arm 62 back from point C to point B applies an upward force to the proximal end of the support rod 44 and returns the grate members 30A, 30B from the downwardly-angled position to the horizontal position. Moving the actuator arm 62 back from point B to point A "locks" the handle, and correspondingly locks the grate members 30A, 30B in the horizontal, charcoal-supporting position, such that the grate 30 supports the weight of the charcoal. In this locking position of the handle 62, the weight of the charcoal supported on the grate 30, alone, is insufficient to move the grate members 30A, 30B downwardly. Only an in initial horizontal movement of the upper end 64 of the actuator arm 62 will release the grate members.

Figure 4:
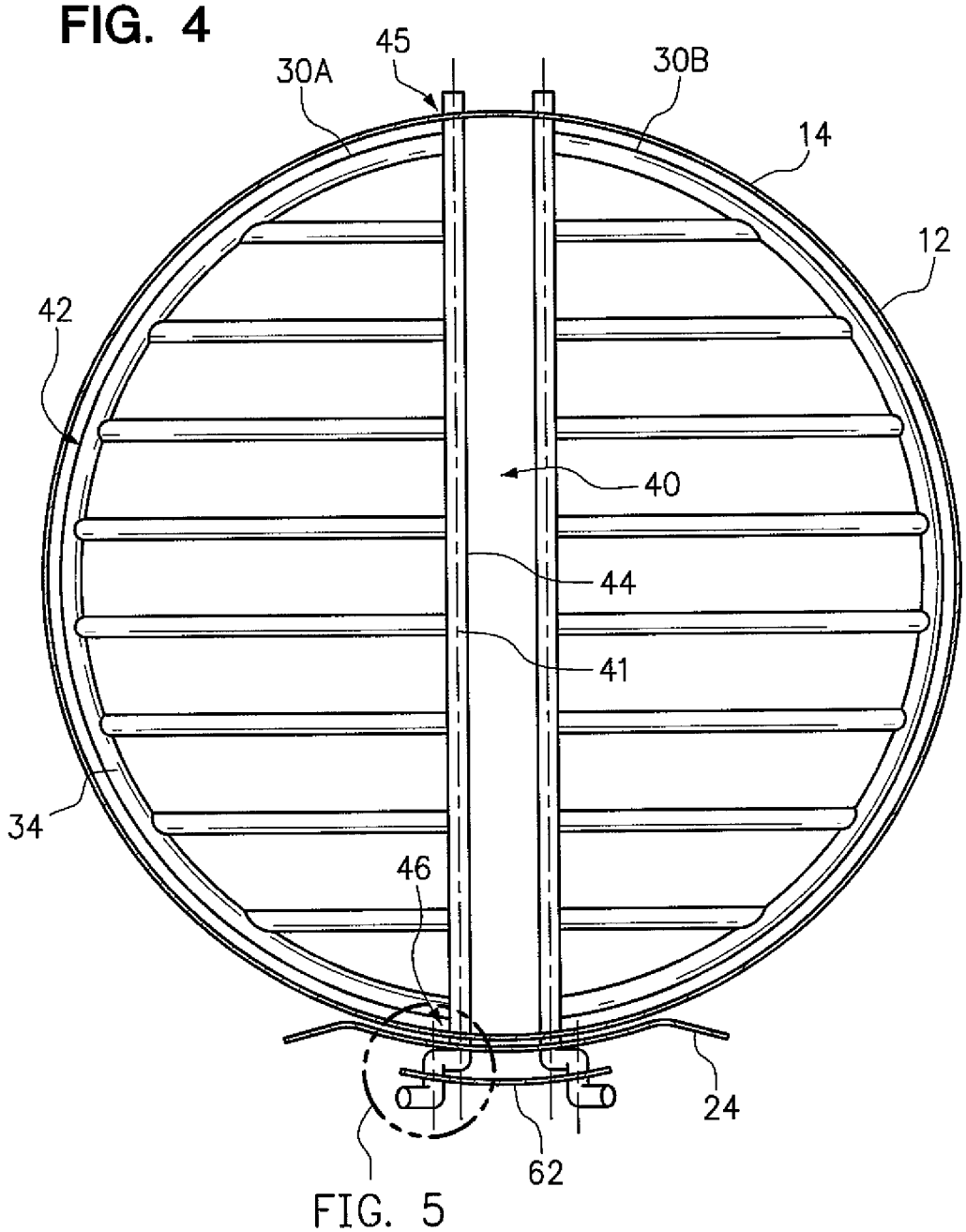
FIG. 4 is a plan view of the igniter further detailing the pivotal mounting of the grate members inside the housing.

FIG. 4 is a plan view of the igniter 10 further detailing the pivotal mounting of the grate members 30A, 30B inside the housing 12. Referring by way of example to the first grate member 30A, the first grate member 30A includes a supported end 40 pivotally supported by the support rod 44 about a pivot axis 41. The grate member 30A also includes a semi-circular free end 42 opposite the supported end 40. The support rod 44 extends along the supported end 40, with one end of the support rod 44 protruding through a hole in the housing 12 at a first pivot point 45 and the other end of the support rod 44 protruding through the housing 12 at a second pivot point 46. The first and second pivot points 45, 46 define the pivot axis 41. The configuration of the second pivot point 46 is discussed in greater detail below with respect to FIGS. 6 and 7. In the vicinity of the second pivot point 46, the support rod 44 includes a dogleg (or crank) having multiple rod segments, as shown in the enlarged detail view of FIG. 5.

The grate members 30A, 30B have an outer profile 34 generally following an inner profile of the housing wall 14 when the grate members 30A, 30B are in the charcoal-supporting position. More specifically, in this embodiment, the grate members 30A, 30B have a semi-circular outer profile 34 that closely fits with a circular inner profile of the housing wall 14 when the grate members are in a horizontal position. This semi-circular outer profile 34 of the grate members 30A, 30B cooperates with the inner profile of the housing wall 14, while the grate members are in the charcoal-supporting position, to prevent large pieces of charcoal from falling between the grate 30 and the housing wall 14. It should be recognized that the housing is not limited to having a circular cross-section, however. For example, in another embodiment, an igniter housing may have a rectangular cross-section, and the grate may have a rectangular profile closely matching the rectangular cross-section of the housing. The grate is also not limited to two grate members. For example, an embodiment may include a single, rectangular grate member pivotally supported along one edge, and which closely matches the profile of a rectangular housing.

Figure 5:
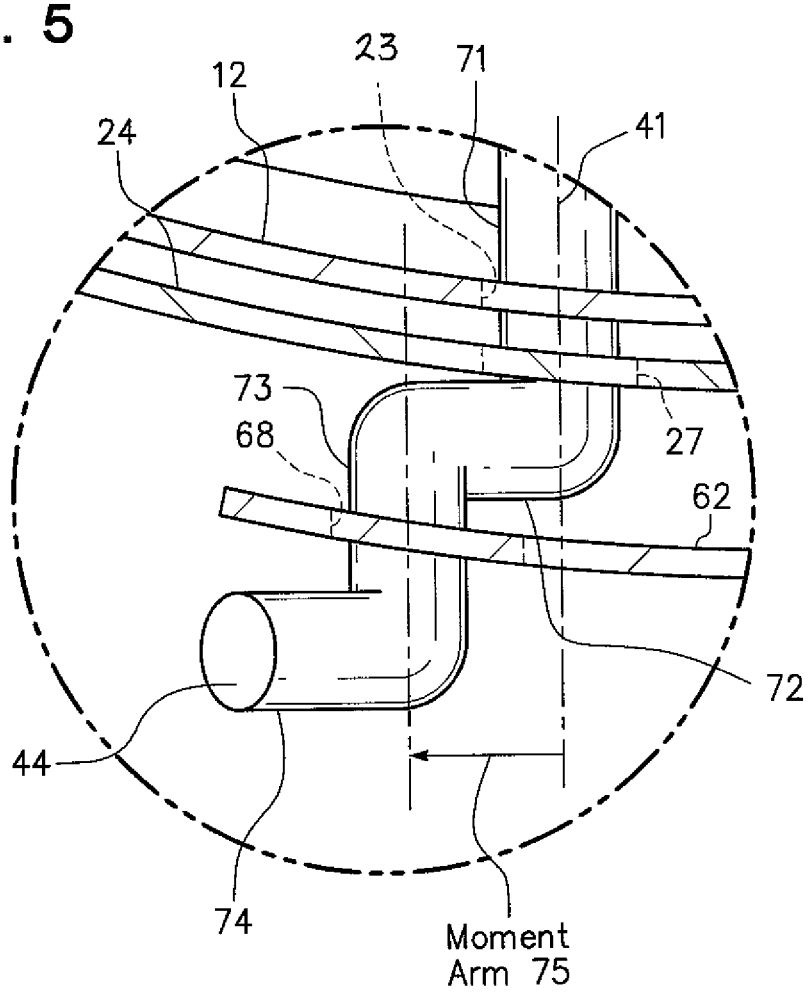
FIG. 5 is an enlarged detail view of a multi-segment actuator rod that pivotally supports the grate member.

FIG. 5 is an enlarged detail view of a multi-segment portion (optionally referred to as a dogleg or crank) on the end of the actuator rod 44 that pivotally supports the grate member 30A in the housing 12 and cooperates with the actuator arm 62 (discussed infra) to control pivoting of the grate member 30A about the pivot axis 41 between the charcoal-supporting and charcoal-releasing positions in response to movement of the actuator arm 62. The multi-segment portion of the rod 44 includes a first rod segment 71 extending from the grate 30A (FIG. 4) through the housing 12 and the heat shield 24. The first rod segment 71 serves as a shaft portion extending between the first pivot point 45 and the second pivot point 46 to define the pivot axis 41 about which the grate member pivots. A second rod segment 72 extends radially outwardly from the first rod segment 71. A third rod segment 73 extends from the second rod segment 72 generally parallel to the first rod segment 71. The first rod segment 71 thus provides a fulcrum about which the third rod segment 73 is moved. The radial spacing between the first and third rod segments 71, 73 provide a moment arm 75 about the pivot axis 41. A tangential force applied to the third rod segment 73 thus moves the grate 30A about the pivot axis 41 (FIG. 4). The actuator arm 62 provides the tangential force that either secures the grate or releases the grate. Specifically, moving the actuator arm 62 between points B and C (FIG. 3) provides a downward component of motion of the actuator arm 62 that allows the third rod segment 73 to move tangentially (lower) about the pivot axis 41. However, as noted above, lateral, horizontal movement of the actuator arm 62 from point B to point A (FIG. 3) provides little or no movement of the third rod segment 73 tangentially about the pivot axis 41. Thus, the weight of charcoal on the grate 30, alone, will be insufficient to move the actuator arm 62 away from position A of the actuator arm 62. Thus, the actuator arm 62 "locks" (i.e., resists movement of) the grate members 30A, 30B in the horizontal, charcoal-supporting position when the actuator arm 62 is in position A.

Figure 6:
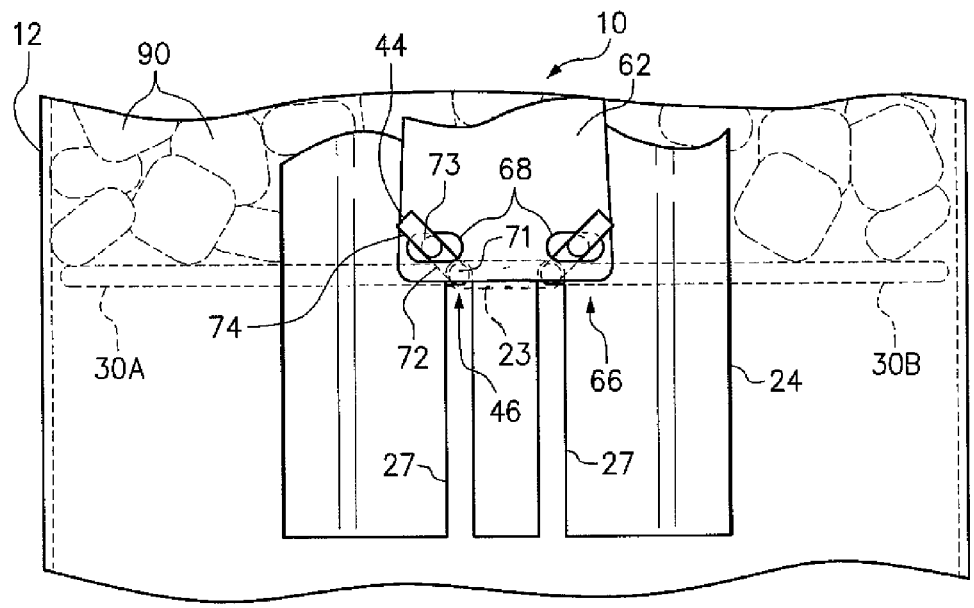
FIG. 6 is a straight side view of the igniter with the grate members in a horizontal, charcoal-supporting position.

FIG. 6 is a straight side view of the igniter 10 with the grate members 30A, 30B in the horizontal, charcoal-supporting position. The rod 44 has a bend, terminating in a fourth rod segment 74 that retains the actuator arm 62 in engagement with the third segment 73. Charcoal briquettes 90 are shown supported on the grate members 30A, 30B. The lower end 66 of the actuator arm 62 is shown coupled to the rods 44 extending from each grate member 30A, 30B (the first grate member 30A is detailed by way of example, but this discussion also applies to the second grate member 30B). A pair of holes 68 in the form of short slots is provided at the lower end 66 of the actuator arm 62. The rods 44 extending from the grate members 30A, 30B each pass through the respective slot 68 on the actuator arm 62. The slot-shape provides some lateral tolerance for facilitating assembly, providing additional clearance for receiving the ends of rods 44 as compared with circular holes. The lower edge of each slot 68 engages the respective rod 44 at the third rod segment 73 (see also discussion of FIG. 5). With the grate members 30A, 30B positioned horizontally, the third rod segment 73 is raised upwardly at about forty-five degrees with respect to horizontal. Thus, when the actuator arm 62 is moved downward (from point B to point C in FIG. 3), each grate member 30A, 30B is allowed to pivot downwardly about its pivot point 46 toward the downwardly-angled, charcoal-releasing position of FIG. 7, discussed below. Although the weight of the grate and charcoal will typically cause the grate to pivot downward when the actuator arm is lowered, the actuator arm 62 could urge the third segment 73 about the pivot point 46 if there is any resistance to pivoting (e.g. due to friction at the pivot point 46, etc.).

Figure 7:
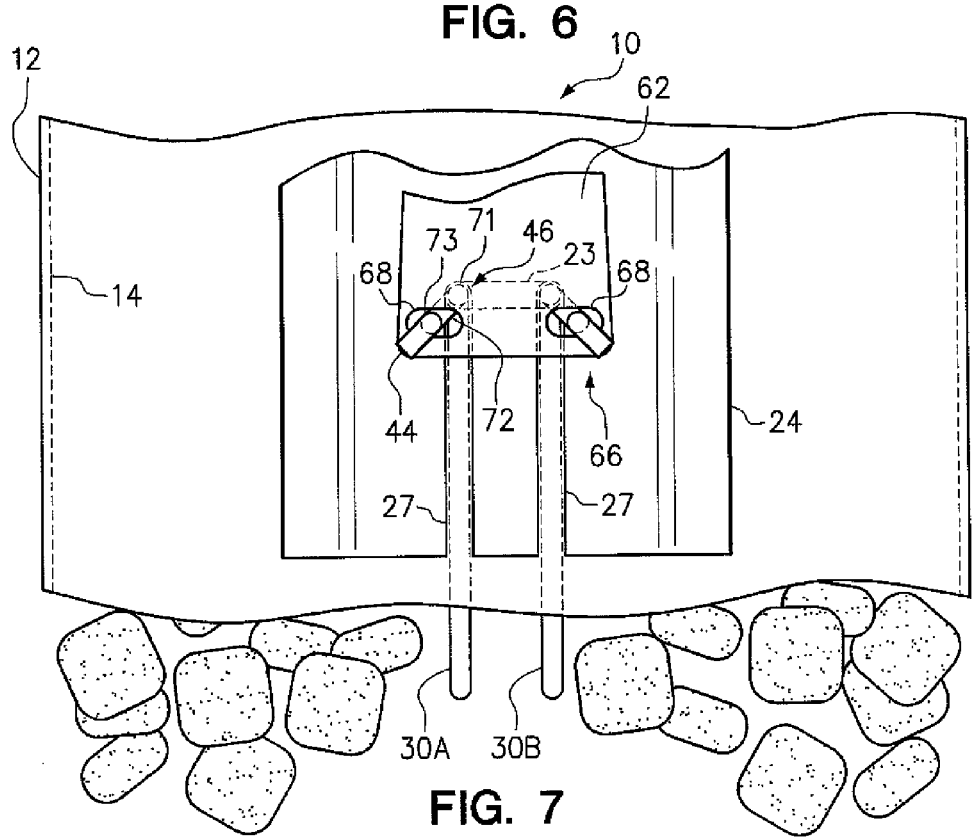
FIG. 7 is a straight side view of the igniter with the grate members in a downwardly-angled, charcoal-releasing position.

FIG. 7 is a straight side view of the igniter 10 with the grate members 30A, 30B in the downwardly-angled, charcoal-releasing position, corresponding to the actuator arm 62 being in position C (see FIG. 3). This position allows the charcoal 90 to pass between the grates 30A, 30B and the inner wall 14 of the igniter housing 12, to release the charcoal into a grill (not shown) beneath the igniter 10. The actuator arm 26 has been lowered from the position in FIG. 6, allowing the third rod segment 73 of each rod 44 to pivot about ninety-degrees about the pivot axis 41 (defined by the shaft 71) to an angle of about forty-five degrees below horizontal, which correspondingly allows the grate members 30A, 30B to pivot downwardly to about ninety degrees from horizontal (i.e. straight downward). After having released the charcoal 90, the grate members 30A, 30B may be returned to their horizontal, charcoal-supporting position (shown in FIG. 6) by moving the actuator arm 62 inward from position C to position A (see FIG. 3), which urges the third segment 73 upward about the pivot point 46. The dual-action of the actuator 60 allows the grate members 30A, 30B to be moved alternately back and forth between the positions of FIGS. 6 and 7. It should also be recognized that, from FIG. 6 to FIG. 7, the left grate member 30A has rotated counter-clockwise and the right grate member 30B has rotated clockwise, as viewed from the side.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A charcoal igniter, comprising:
a housing having a wall defining an interior charcoal space for receiving charcoal;
at least one grate having a shaft pivotally connected within the housing, the grate being pivotable from a charcoal-supporting position to a charcoal-releasing position, the grate having an outer profile generally following an inner profile of the housing wall when in the charcoal-supporting position; and
an actuator, including an actuator arm movably coupled to the housing, the actuator arm moveable between a first position for securing the grate in the charcoal-supporting position and a second position for positioning the grate in the charcoal-releasing position, a multi-segment actuator rod extending from the grate and including a first rod segment extending through a support hole in the housing, a second rod segment radially extending from the first rod segment, and a third rod segment extending from the second rod segment generally parallel to the first rod segment;
wherein the first rod segment defines a first pivot axis about which the grate is pivotally supported on the housing; and
wherein the actuator arm is slidably engaged at a first end on a track and coupled at a second end to the second rod segment of the multi-segment actuator rod, wherein movement of the actuator arm in a first direction along the track moves the grate to the charcoal supporting position and moving the actuator arm in a second direction along the track opposite the first direction moves the grate to the charcoal-releasing position.

2. The charcoal igniter of claim 1, further comprising:
a handle secured to the housing, the handle defining the track.

3. The charcoal igniter of claim 2, wherein the track comprises:
an opening on the handle for receiving the first end of the actuator arm, the handle having an inner edge along the opening and opposing ends limiting a range of movement of the actuator arm; and
a groove on the actuator arm for receiving the inner edge of the handle, such that the actuator arm rides along the inner edge of the handle over the defined range of movement.

4. The charcoal igniter of claim 1, wherein the inner profile of the housing wall is circular and the outer profile of the grate is semi-circular.

5. The charcoal igniter of claim 1, wherein moving the actuator arm from the first position to the second position releases the grate from the charcoal-supporting position to move under gravity to the charcoal-releasing position.

6. The charcoal igniter of claim 1, wherein the charcoal-supporting position is substantially horizontal and the charcoal-releasing position is substantially vertical downward.

7. The charcoal igniter of claim 1, further comprising:
the at least one grate including a pair of grates, each grate including a supported end pivotally supported about a pivot axis and a free end opposite the supported end;
wherein the outer profile of each grate along the free end matches the inner profile of the housing wall when the pair of grates are in the charcoal-supporting position.

8. A charcoal igniter, comprising:
a housing having a wall defining an interior charcoal space for receiving charcoal;
at least one grate having a shaft pivotally connected within the housing and a multi-segment actuator rod extending from the grate and including a first rod segment extending through a support hole in the housing, a second rod segment radially extending from the first rod segment, and a third rod segment extending from the second rod segment generally parallel to the first rod segment;
the grate being pivotable from a charcoal-supporting position to a charcoal-releasing position, the grate having an outer profile generally following an inner profile of the housing wall when in the charcoal-supporting position; and
an actuator arm movably coupled to the housing and having a first end slidably engaged on a track and a second end coupled to the second rod segment of the multi-segment actuator rod, the actuator arm moveable between a first position for securing the grate in the charcoal-supporting position and a second position for positioning the grate in the charcoal-releasing position;
wherein movement of the actuator arm in a first direction along the track moves the grate to the charcoal supporting position and moving the actuator arm in a second direction along the track opposite the first direction moves the grate to the charcoal-releasing position.

9. The charcoal igniter of claim 8, wherein the shaft defines a pivot axis of the grate.

10. The charcoal igniter of claim 8, further comprising:
a handle secured to the housing, the handle defining the track.

11. The charcoal igniter of claim 10, further comprising:
an opening on the handle for receiving a portion of the actuator arm, the opening having opposing ends for limiting a range of movement of the portion of the actuator arm received in the opening; and
a groove on the actuator arm for receiving an inner edge of the handle such that the actuator arm rides along the inner edge of the handle over the limited range of movement between the opposing ends of the opening.

12. The charcoal igniter of claim 8, wherein the at least one grate having a shaft pivotally connected within the housing and a multi-segment actuator rod extending from the grate and including a first rod segment extending through a support hole in the housing, a second rod segment radially extending from the first rod segment, and a third rod segment extending from the second rod segment generally parallel to the first rod segment comprises:
a first side grate having a shaft pivotally connected within the housing and a multi-segment actuator rod extending from the first side grate and including a first rod segment extending through a first support hole in the housing, a second rod segment radially extending from the first rod segment, and a third rod segment extending from the second rod segment generally parallel to the first rod segment, and a second side grate having a shaft pivotally connected within the housing and a multi-segment actuator rod extending from the second side grate and including a first rod segment extending through a second support hole in the housing, a second rod segment radially extending from the first rod segment, and a third rod segment extending from the second rod segment generally parallel to the first rod segment.

* * * * *